US008931092B2

(12) United States Patent
Wyschogrod et al.

(10) Patent No.: US 8,931,092 B2
(45) Date of Patent: Jan. 6, 2015

(54) SYSTEM AND METHOD FOR COMPUTER INSPECTION OF INFORMATION OBJECTS FOR SHARED MALWARE COMPONENTS

(75) Inventors: Daniel Wyschogrod, Newton, MA (US); Steven W. Jilcott, Foxboro, MA (US); Jonathan Aron Rubin, Bedford, MA (US); John O. Everett, Great Falls, VA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 73 days.

(21) Appl. No.: 13/592,596

(22) Filed: Aug. 23, 2012

(65) Prior Publication Data

US 2014/0059684 A1    Feb. 27, 2014

(51) Int. Cl.
*G06F 21/56* (2013.01)

(52) U.S. Cl.
USPC .................................. 726/22; 726/23; 726/24

(58) Field of Classification Search
None
See application file for complete search history.

(56) References Cited

U.S. PATENT DOCUMENTS

| | | | |
|---|---|---|---|
| 7,945,898 B1* | 5/2011 | Episkopos et al. | 717/124 |
| 8,321,942 B1* | 11/2012 | Chiueh et al. | 726/24 |
| 8,443,354 B1* | 5/2013 | Satish et al. | 717/156 |
| 2007/0239993 A1* | 10/2007 | Sokolsky et al. | 713/188 |
| 2012/0072988 A1* | 3/2012 | Agrawal | 726/24 |
| 2012/0240231 A1* | 9/2012 | Sohn et al. | 726/24 |

OTHER PUBLICATIONS

Bailey, M., et al., "Automated Classification and Analysis of Internet Malware", In *Proceedings of Recent Advances in Intrusion Detection (RAID '07)*, (Apr. 26, 2007), 1-18.
Caldiera, G., et al., "Identifying and Qualifying Resuable Software Components", *IEEE Computer*, (1991), 61-70.
Dullien, T., et al., "Automated Attacker Correlation for Malicious Code", *RTO-MP-IST-091*, (Mar. 22, 2010), 26-1-26-10.
Hu, X., et al., "Large-Scale Malware Indexing Using Function-Call Graphs", *ACM Conference on Computer and Communications Security (CCS '09)*, (Nov. 9-12, 2009, Chicago, IL), (2009), 611-620.
Liang, W., et al., "Component Similarity Based Methods for Automatic Analysis of Malicious Executables", In *Proceedings of Virus Bulletin Conference 2007 (VB '07)*, Vienna, Austria, (Sep. 2007), 15 pgs.
* cited by examiner

*Primary Examiner* — Jung Kim
*Assistant Examiner* — Adrian Stoica
(74) *Attorney, Agent, or Firm* — Schwegman Lundberg & Woessner, P.A.

(57) ABSTRACT

Embodiments of a system and method for computer inspection of information objects, for example, executable software applications for common components that may include elements of computer viruses, items from hacker exploit libraries, or other malware components. Information objects may contain identified sequences of instructions, each of which may be identified and hierarchically grouped based on their structural relationship(s). In the software context, programming languages may include multiple components that include functional code; these components are often shared between programmers. In some embodiments, an inspection of the hierarchical relationship of components (e.g., constituent functions) in the information objects may allow for identification of common components shared between programs. In some embodiments, authorship of objects or components in the objects may be identified by comparisons between component samples. In some embodiments, inspection of the relationship between components is limited to component groups having a specified structural size, complexity, or eccentricity.

26 Claims, 8 Drawing Sheets

SYSTEM AND METHOD FOR COMPUTER INSPECTION OF INFORMATION OBJECTS FOR SHARED MALWARE COMPONENTS

STATEMENT REGARDING FEDERALLY SPONSORED RESEARCH OR DEVELOPMENT

This invention was made with government support under award number FA8750-10-C-0173 awarded by the Defense Advanced Research Projects Agency (DARPA). The government has certain rights in this invention.

TECHNICAL FIELD

Embodiments pertain to computer program inspection. Some embodiments relate to detecting malware in software applications. Some embodiments relate to detecting malware authorship. Some embodiments relate to detecting social relationships. Some embodiments relate to constructing hierarchical relationships between component groups of a specified size and complexity based on identified dependencies between components in computer programs.

BACKGROUND

Separating an object into its constituent components, thereby allowing an analysis of the internal structure of the object based on those components, is a long-standing problem in the reverse engineering of complex systems, particularly in the areas of computer software analysis and malware detection. Various techniques have been developed to compare software samples. Existing literature discusses comparing source code samples for software engineering reuse purposes, but the body of literature on comparing executables is limited. Most research on executable comparison focuses on the comparison of entire executables for similarities.

Malware is frequently built by statically linking newly created control code with various existing libraries producing a resultant stripped binary module. Computer malware detection has typically been conducted with the use of programs that monitor files and applications on individual computers. The detection methods often rely on large databases that contain signatures of previously identified computer viruses, worms, trojans, spyware, or other malicious computer programs. Malware scanning programs search individual files on individual computers searching for known signatures. While this pattern detection approach can be effective it requires frequent updates to the database of signatures to keep abreast of the most recent malware developments and may not provide any indication of the source of the malware infection.

Interest by the reverse engineering and anti-malware communities in analysis of applications has increased due to the widespread public adoption of computing technologies such as personal computers and smart phones, and the large amount of personal or financial data that may be subject to exploitation by malicious programs. There are also general needs for forensic tools that may assist with the identification or location of malware authors or distributors.

BRIEF DESCRIPTION OF THE FIGURES

Embodiments discussed in the present document are illustrated, by way of example, and not limitation, in the Figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Reverse engineering efforts have typically focused on performing analysis of individual information objects such as software applications, libraries, or executable programs. However, malware is frequently built by linking newly created control code components with various existing libraries to produce a resultant stripped binary module that forms an executable program stored in a binary file. Therefore, in many circumstances it may be useful to determine from one or more executable binaries which library functions are in the binaries, and to identify any functions or software components that may have been reused, or are similar to, previously identified samples of other malware binaries.

For example, information objects may contain identified sequences of binary instructions (e.g., components), each of which may be labeled with a symbol or recognized as a reoccurring pattern. In the software application context, some programming languages such as Objective-C®, Java®, and .NET® include symbol information in their resulting executable programs. In another example, executable programs may not contain human identifiable symbols, and additional forensic tools or techniques may be employed to identify libraries, functions, procedures, or other component elements that may be included in an executable binary file. Generally, authors of malware who are trying to conceal their identity will remove symbols from an executable.

A static call graph may be utilized to describe subroutines or functions that invoke, or are invoked by, other subroutines or functions in a computer program object. Symbol names are not necessarily needed to construct a static call graph. The static call graph for computer program object may be represented as a directed graph where each node corresponds to a function, and each edge corresponds to a call between functions. For purposes of this application, functions may be considered synonymous with components.

Program components may be identified by a name, an assigned identifier, a calculation that identifies the object uniquely, such as a hash of the components, or any other mechanism that allows one component to be distinguished from other components, and similarly provides for an accurate determination of identity between two components for comparison. Other techniques may also be utilized to compare functions or components.

Two components may be compared in order to determine if they are identical, or if they are similar within a specified threshold of comparison. For example, two components may be identical if hashes of components obtained from two different samples are identical. In another example, two components may be nearly identical if they are similarly sized and both call an identical set of subgraph components in an identical sequence. In another example, two components may be similar if they both call, e.g., depend on, an identical or nearly identical set of subgraph components.

In general, possible candidate reusable components may be extracted from the structure of a directed call graph of an individual program through any of a variety of techniques. From a set of extracted candidate reusable components, specific common components may be compared between executables to potentially identify likely reused components, and associate new component samples with previously acquired samples of known or suspected authorship.

Figure 1:
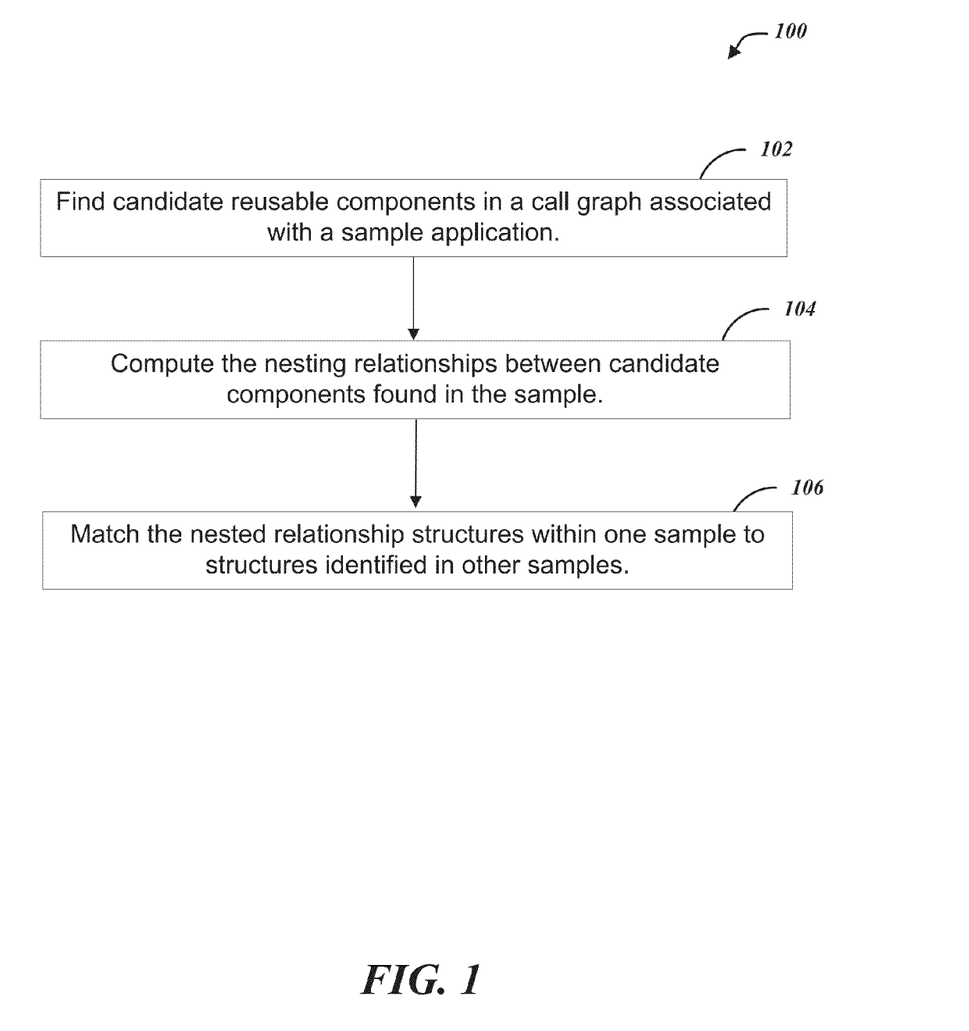
FIG. 1 illustrates a scheme for identifying unique and potentially reused program components, in accordance with some embodiments.

By way of example, computer program components that are independently developed, e.g., not included in a standard library that was linked into the program, may be identified by extraction and comparison against known independent samples of code. FIG. 1 illustrates a scheme 100 for identifying unique or potentially reusable components. At 102, an extraction process may be used to find candidate reusable components in a call graph associated with a sample application. Reusable components may be considered a sequence of program components that may be found in a similar or identical form in multiple disparate programs.

The extraction and analysis of static call graphs provides for a consistent mechanism to assess the similarity of two components identified within a computer program object. For example, a sequence of dependent function calls in a first program object may constitute multiple nodes in a call graph. The appearance of the same nodes in a second call graph extracted from a second program may indicate that an identical sequence of dependent function calls, which may indicate similar or identical code functionality, are present in both the first and the second programs.

Component extraction may be based on the concept that a library module that can be linked into an executable must have a node in the call graph that can serve as an entry point, and all nodes reachable from it via edge transitions represent the reusable component. For example, a malicious software developer who has discovered a flaw in an operating system that allows the developer to compromise computers running the operating system may create a library containing code to exploit the flaw. Other malicious developers may utilize the library by linking it into their own programs, without the need to fully understand or appreciate the flaw or how to exploit it, thereby potentially compromising additional computers with a new malware variant. Extraction of the library from multiple samples may provide clues or information that indicate the source or sources responsible for developing or distributing malware.

At 104, a construction process may be used to compute nesting relationships between candidate components in a sample program. The static call graph of a program can be analyzed for sequences of program components that depend on one another, and that may be able to function as a program component or library. Each component may be linked to other components it depends on, and the dependencies may be stored in a data structure, such as a linked list, a table, or another appropriate structure, for further analysis.

For example, a multi-feature program such as a word processor may include separate components for loading, editing, formatting, saving, printing, and e-mailing documents. Each of these components may include various subcomponents that may be unique or shared among the higher-level components. A second program, such as a spreadsheet, may include the same e-mailing component if a programmer reused the e-mailing component. If the static call graphs of the e-mailing component from the spreadsheet and the word processor are compared they should be very similar if not identical. This similar or identical nesting relationships for both programs' e-mailing components therefore may serve as an indication that the author or authors of the word processing program and the spreadsheet program are the same, or that they cooperated by sharing code for the e-mailing component. Based on this information a social relationship between the authors of the code may potentially be inferred. Similarly, if the word processing program or the spreadsheet were to become infected with malware that includes a library of code to exploit a flaw, as in the operating example discussed above, then the library would appear as a sequence of components in the static call graph of the executable word processing or spreadsheet program.

At 106, a comparison process can match the nested structures within one sample to those structures identified in other samples. For example, the nesting relationships for a third program, e.g., a presentation maker, may be calculated from an extracted call graph and then compared to the nesting relationships obtained from the spreadsheet and word processing program. If a programmer reused the e-mailing component for all three programs a match may be detected in the nesting relationship of that component.

However, computing the graph isomorphism of large static call graphs can be computationally expensive. One approach to finding candidate reusable components within a call graph is to eliminate the analysis of small components that typically involve only a few calls to standard libraries. Additionally, because extracting a call graph for a large component with many dependencies is typically resource intensive, and components that are close to the size of the entire graph tend not to be reused it may therefore be computationally efficient to disregard large components from analysis. Thus, a scheme to extract potential components of interest to extract modules within a specified size and complexity range may alleviate the computational load and inefficiencies associated with calculating graph isomorphism.

Figure 2:
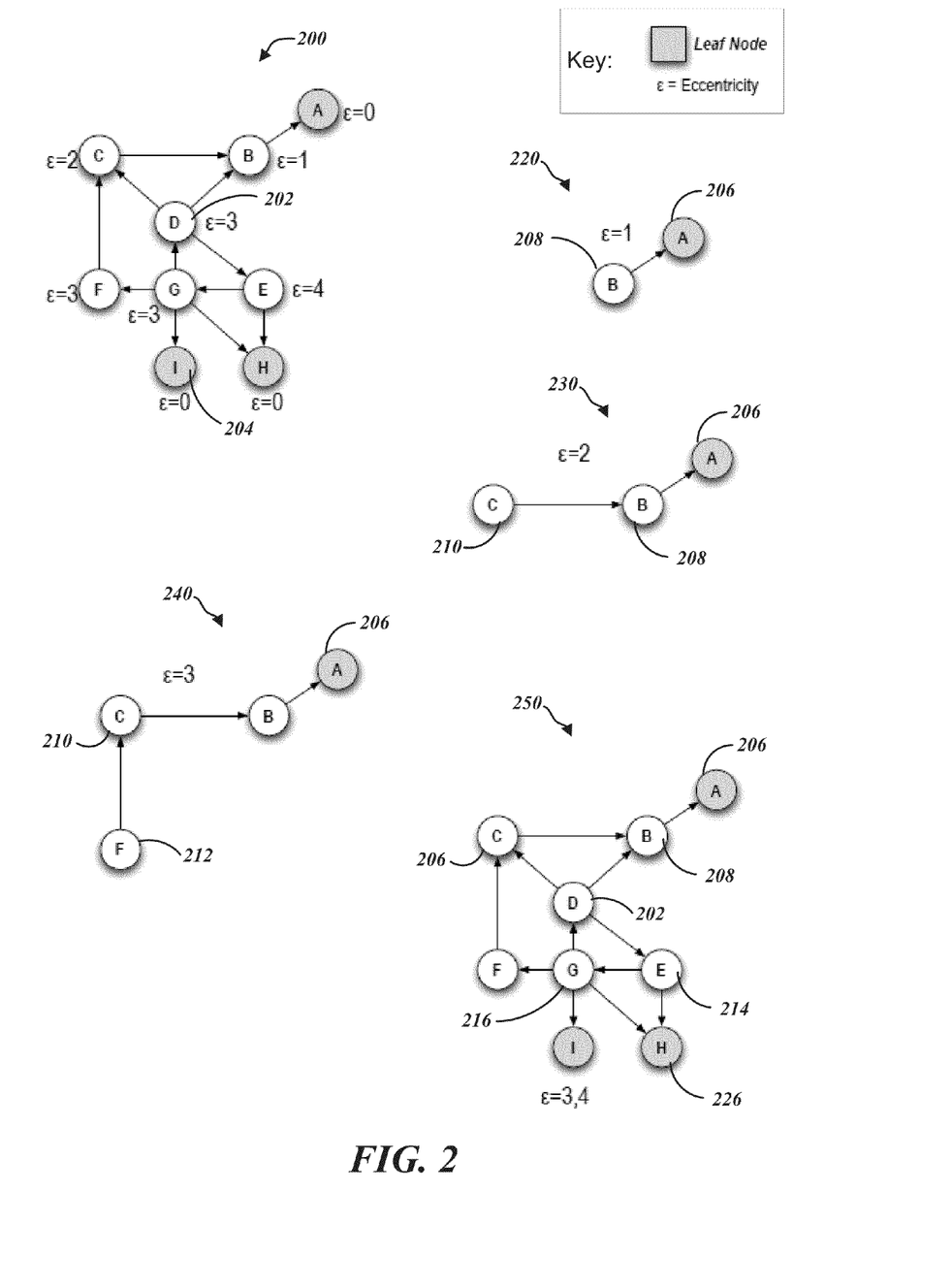
FIG. 2 illustrates example directed graph representations of components in a computer program, in accordance with some embodiments.

FIG. 2 illustrates an example representation of directed graph 200 of components in a hypothetical computer program. In this example a simple program object is constructed from nine components, nodes 'A' through 'I' and their respective connecting directed edges. Directed graph eccentricity may be used as a measure of size and complexity of the entire graph, as well as individual subgraphs. Eccentricity for a graph may be defined for a root node and a directed subgraph reachable from the root as the maximum shortest-distance from the root node to any other node in the subgraph. A leaf node, a node with no outgoing paths, has an eccentricity of zero ($\epsilon=0$). In the directed graph 200 the eccentricity of the subgraph rooted at node-D 202 is three ($\epsilon=3$) because the longest shortest-path in the directed graph 200 from node-D 202 to node-I 204, (path: D-E-G-I) that has three edges. Directed graph 200 includes several subgraphs of varying eccentricity.

FIG. 2 also depicts subgraph 220, which includes node-A 206 that has one incoming edge from node-B 208. The eccentricity of subgraph 220 is therefore one. Subgraph 230 includes node-A 206 that has one incoming edge from node-B 208, as well as node-C 210 that provides an outgoing edge to node-B 208. The eccentricity of this subgraph 230 is two because there are two edges that must be traversed from the root node-C 210 to the node farthest from it, node-A 206, measured by shortest-path distance. Subgraph representation 240 includes node-A 206, node-B 208, and node-C 210, as well as node-F 212 that follow the longest shortest-path from node-F 212 to a leaf note (path: F-C-B-A), which results in an eccentricity of three for node-F 212.

Subgraph 250, which includes all of the nodes and edges of the directed graph 200, depicts all of the subgraphs of the directed graph 200 that have an eccentricity of three or four. For example, root node-E 214 has an eccentricity of four due to the path that traverses nodes E-G-D-B-A, and root node-G 216 has an eccentricity of three due to the subgraph that traverses nodes G-D-B-A. In this example, the directed graph 200 does not include any subgraphs that have an eccentricity of five or higher.

A component extraction algorithm may be utilized to efficiently find and extract components within a range of eccentricities. Component extraction may be based on the premise that a component that can be linked into an executable program object will have a node in the call graph that can serve as an entry point (e.g., a root node), and all nodes reachable from that entry point via edge transitions represent the reusable component. By focusing on finding components in program executables that can stand alone as reusable components the matching of these components against known samples is simplified.

Because potential reusable components within a call graph may include small components, which typically involve only a few calls to standard libraries and are generally benign and uninteresting, it is useful to be able to quickly eliminate components with low eccentricity from consideration as candidate reusable components for further analysis. Similarly, because extracting large components is typically resource intensive, and components that are close to the size of the entire graph tend not to be reused, it is useful to be able to quickly eliminate components with high eccentricity from consideration as candidate reusable components for further analysis.

For example, given a directed graph with a maximum eccentricity of ten, components with an eccentricity of at least two, and less than eight, may be potential candidates for analysis. Components with an eccentricity of two or less, or more than eight, may be safely ignored. These values may change based on the size and complexity of the one or more programs being analyzed. A program with a maximum eccentricity of six may only require analysis of components with eccentricity between two and four. Similarly, a very large program that includes multiple libraries may have a maximum eccentricity ranging from fifty to one-hundred, and necessitate analysis of components with eccentricity in wide ranges (e.g., $2 \leq \epsilon \leq 20$), or multiple adjacent or overlapping ranges (e.g., $3 < \epsilon < 10$ and $5 < \epsilon < 20$) to accurately identify possible candidate reusable components. Eccentricity ranges may be minimized to reduce processing time necessary to perform extraction, nesting, and comparison of candidate components.

Figure 3:
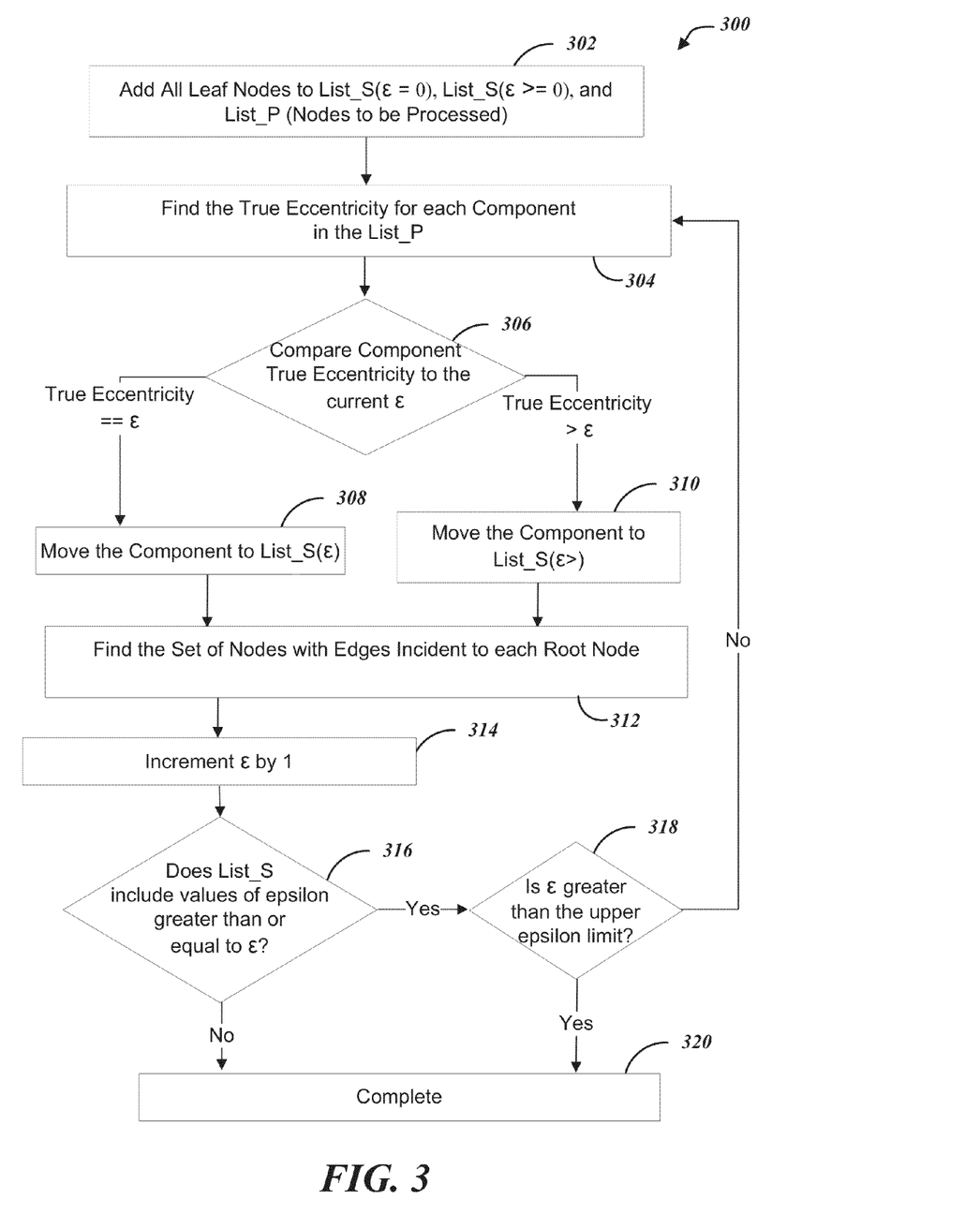
FIG. 3 illustrates a scheme for constructing a list of sets of components sorted by eccentricity, in accordance with some embodiments.

FIG. 3 illustrates a scheme 300 for constructing a list of sets of components sorted by eccentricity. For a sample directed graph, and a range of eccentricities between an upper and lower bound, a list of sets of subcomponents sorted by eccentricity can be generated. List_S($\epsilon$>) is a set of components that have eccentricity of at least $\epsilon$ and perhaps greater. The symbol $\epsilon$ represents eccentricity in this example. List_R($\epsilon$>) is a set of root nodes for List_S($\epsilon$>).

At 302, all leaf nodes, e.g., nodes with zero outgoing edges ($\epsilon$=0), in the sample directed graph are added to a list of components with an eccentricity of zero. Add all nodes with zero outgoing edges to the list of nodes to be processed. These nodes are also placed in both the List_S(0) and the List_S(0>).

At 304, for each component in List_S($\epsilon$>) find the true eccentricity of the component. If the true eccentricity of the component is equal to c, at 308 move the component from List_S($\epsilon$>) to List_S($\epsilon$). If the true eccentricity of the component is greater than $\epsilon$, the, at 310, move the component List_S($\epsilon$>).

At 312, for each root node R in List_R($\epsilon$>), find the set of nodes with edges incident on R. Add the component rooted at R to List_S($\epsilon$+1). Note that the component rooted at R is guaranteed to have an eccentricity at least one greater than $\epsilon$. At 314, $\epsilon$ is incremented by one.

At 316, if List_S($\epsilon$>) is empty for all values of epsilon greater than or equal to $\epsilon$, then the process is completed at 320; otherwise, if, at 318, $\epsilon$ is greater than the upper epsilon limit then, also terminate at 320. If the upper epsilon limit hasn't been reached, and the List_S($\epsilon$>) includes components with epsilon values greater than or equal to $\epsilon$, then the process continues at 304 with the incremented $\epsilon$ value.

For example, referring again to FIG. 2, directed graph 200 includes three leaf-nodes (A, H, and I). Scheme 300 begins with these three leaf nodes, which lack outgoing edges, to form List_S(0) as well as List_R(0), at 302. At 304, the scheme 300 finds the set of nodes with edges incident on List_R(0), which in the directed graph 200 consists of nodes B, E and G.

The component rooted at node-B 208 is {B,A}, which is depicted as subgraph 220 with a true eccentricity of one. The component rooted at node-E 214 is {E,G,D,F,I,C,B,A,H}, which is depicted as subgraph 250 with a true eccentricity of four. The eccentricity of four for node-E 214 corresponds to the edges (E→G→D→B→A). The component rooted at node-G is {G,F,E,H,I,D,C,B,A} which has a true eccentricity of three, corresponding to the edges (G→D→B→A).

Accordingly, only the component rooted at node-B 208 belongs in List_S(1). If the upper limit of epsilon was set to one, the algorithm would terminate at 318, otherwise it would continue for components incident on node-B, at 306, in this example node-D 202 and node-C 210. By adjusting the upper epsilon limit it is possible to quickly determine the highest call level shared functions in situations where program components invoke other program components. By adjusting the lower epsilon limit it is possible to quickly eliminate program components that are trivial, or commonly used functional building blocks that are typically included in commercial (e.g., off-the-shelf) standard libraries that are benign and uninteresting.

These examples describe extracting components within a range of eccentricities. Other techniques for program inspection may also be used to extract and organize program components. Once components have been extracted and organized they can be compared. Efficient comparisons of components can be facilitated by eliminating as many mismatches as possible with a small number of comparisons, and by finding the largest (highest eccentricity) reusable component that is shared between samples. These mechanisms can be used to determine the similarity of malware samples based on the number and size of common components as well as provide lists of common components to be searched for in new malware samples.

Structurally-based component extraction and the use of selective graph-isomorphism mechanisms for comparing components of particular size and configuration across samples can provide more accurate analysis of potential malware components, while also efficiently performing sample comparisons without the need for brute force graph-isomorphism comparisons. In an example, new generations of malware may be composed of components extracted from software libraries in a manner similar to standard software components. Therefore, additional efficiencies can be achieved by eliminating known standard software components from the pool of candidate components for comparison with known malware components.

Figure 4A:
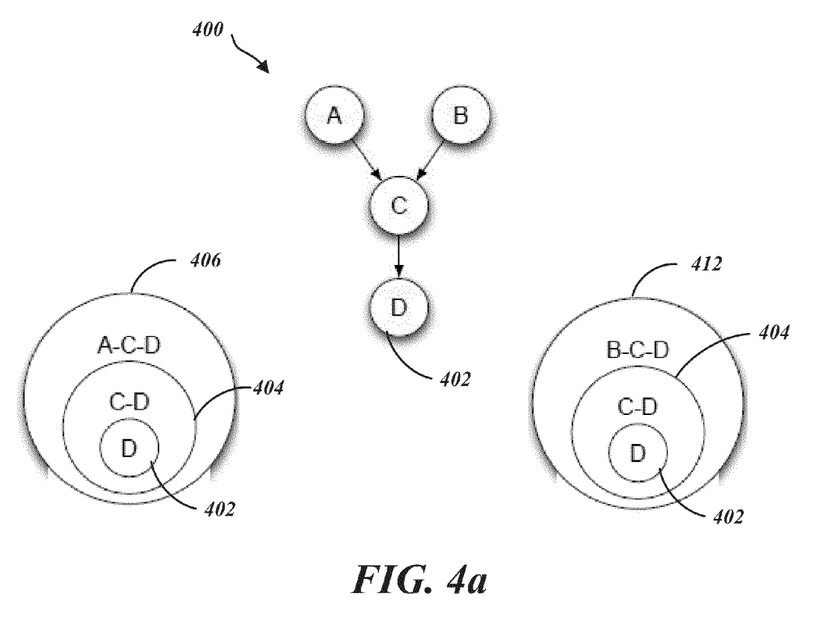
FIGS. 4a and 4b illustrate examples of two subgraphs represented by nested relationships, in accordance with some embodiments.

FIG. 4a illustrates an example of a four-element structure 400 and its nested components as represented by nested component structure A-C-D 406 and nested component structure B-C-D 412. Structure 400 includes four nodes, and three edges that connect the nodes, as depicted. Node-D 402 is the smallest subgraph in structure 400. All of the other nodes in structure 400 depended, either directly or indirectly, on Node-D 402. The next largest component in structure 400 is subgraph C-D 404. There are two subgraphs that contain three nodes, structure A-C-D 406 and structure B-C-D 412. Both structure A-C-D 406 and structure B-C-D 412 depend on subgraph C-D 404.

Figure 4B:
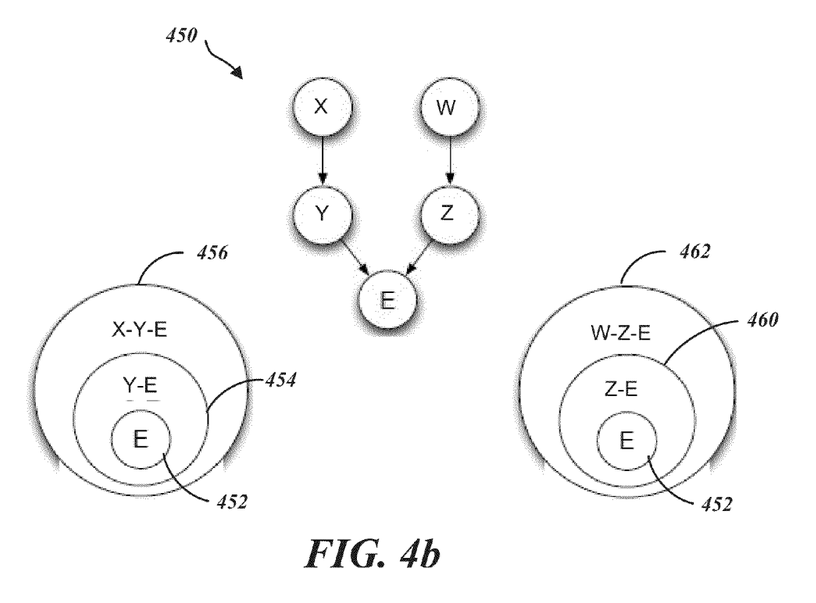

FIG. 4b illustrates an example of a five-element structure 450 represented by nested component structure X-Y-E 456 and nested component structure W-Z-E 462. Subgraph 450 includes five nodes, and four edges that connect the nodes, as depicted. Node-E 452 is the smallest subgraph in structure 450. All of the other nodes in structure 450 depended, either directly or indirectly, on Node-E 452. There are two subgraphs that contain two nodes, structure Y-E 454 and structure Z-E 460. There are two subgraphs that contain three nodes, structure X-Y-E 456 and structure W-Z-E 462.

Figure 5:
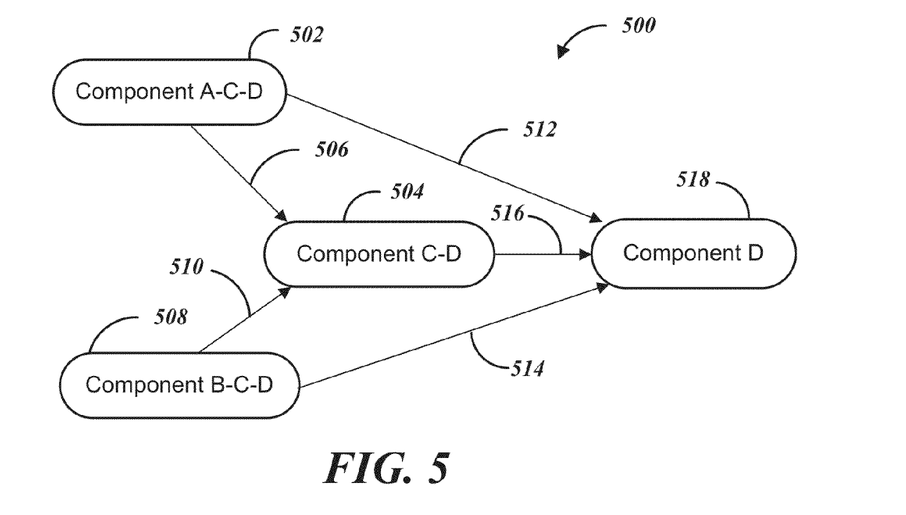
FIG. 5 illustrates an example of a containment graph of the subgraphs of FIG. 3, in accordance with some embodiments.

FIG. 5 illustrates an example of a containment graph 500 of the subgraphs depicted in FIG. 4a. A containment graph is one example implementation for extracting and storing a nested component structure. Each node in the containment graph may correspond to a component extracted from a program object, such as, the candidate component discovery phase depicted in FIG. 1.

The edges in the containment graph correspond to a containment relationship. For example, the graph A-C-D 502 contains the graph C-D 504 because edge 506 from the super set (A-C-D 502) to the subset (C-D 504). The graph B-C-D 508 contains the graph C-D 504 because of edge 510. As indicated by the edges (512, 514, 516) from A-C-D to D, from B-C-D to D, and from C-D to D, respectively, component-D 518 is included in all of the other graphs in containment graph 500.

Figure 6:
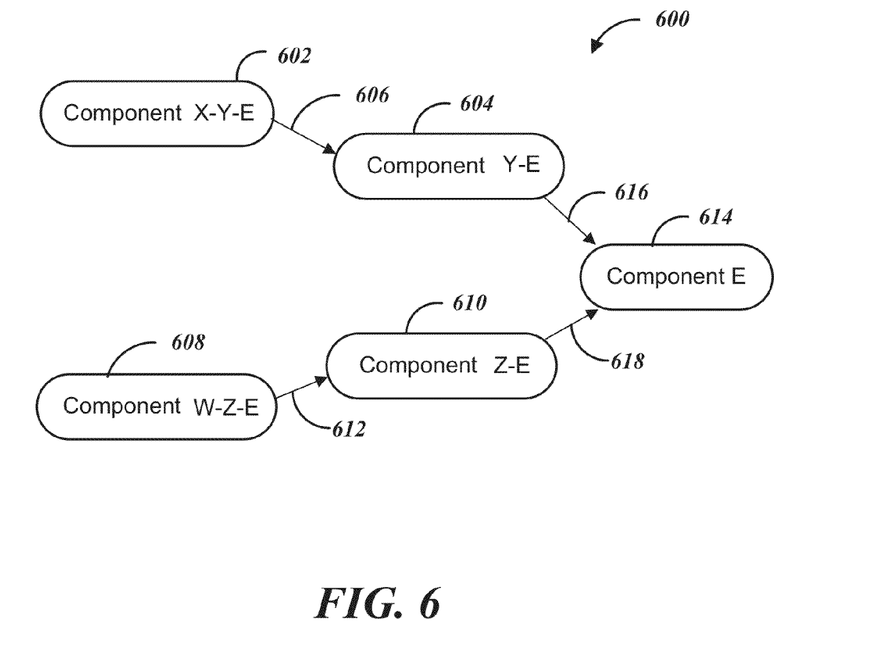
FIG. 6 illustrates an example of a containment graph of the subgraphs of FIG. 4, in accordance with some embodiments.

FIG. 6 illustrates an example of a containment graph 600 of the subgraphs depicted in FIG. 4b. The graph X-Y-E 602 contains the graph Y-E 604 as indicated by edge 606. The graph W-Z-E 608 contains the graph Z-E 610 as indicated by edge 612. The graph Y-E 604 contains component-E 614 as indicated by edge 616, and the graph Z-E 610 contains component-E 614 as indicated by edge 618.

Figure 7:
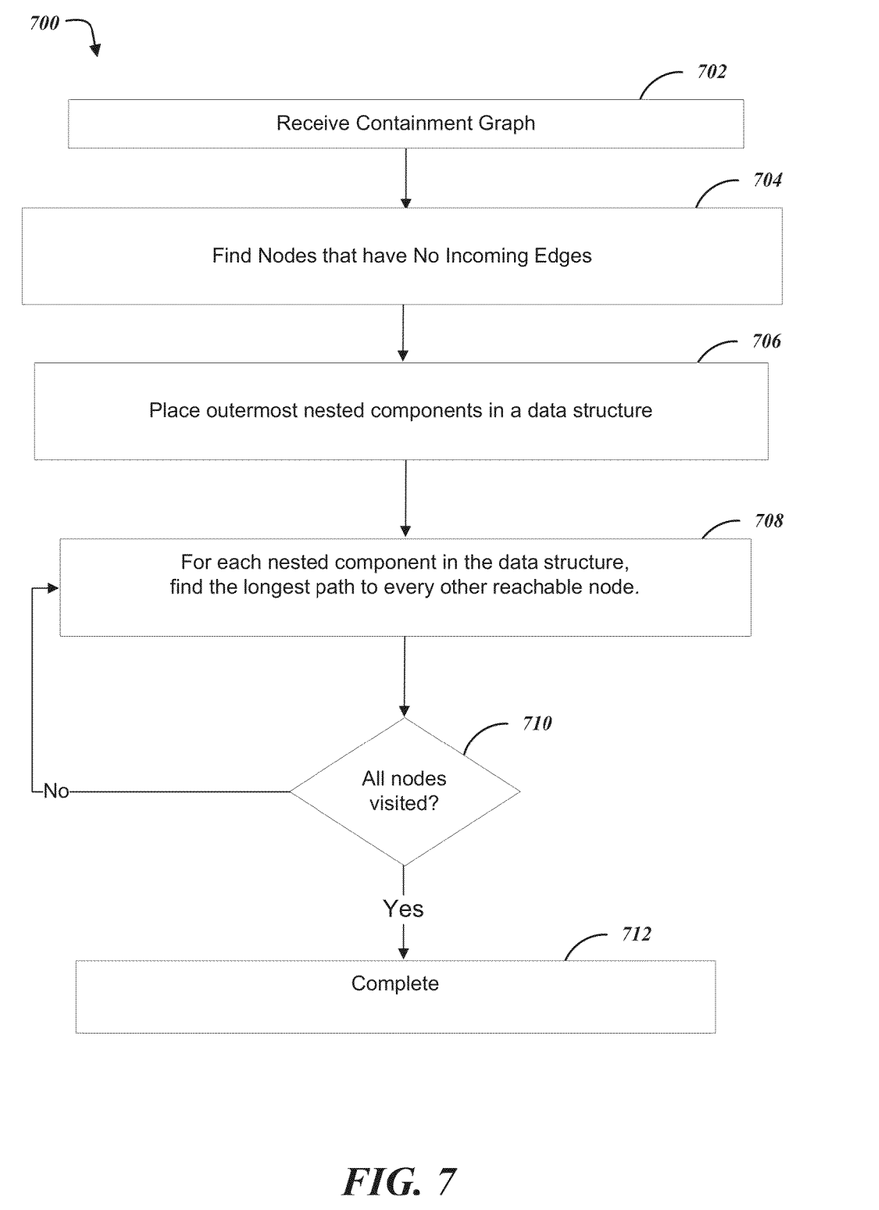
FIG. 7 illustrates a scheme for extracting nested component structures from a containment graph, in accordance with some embodiments.

FIG. 7 illustrates an example scheme 700 for extracting nested component structures from a containment graph.

At 702, a containment graph is received. For example, a data structure containing components, such as those depicted in containment graph 500 of FIG. 5.

At 704, find any nodes in the graph that have no incoming edges. For example the root nodes as represented by the outermost nested components, such as graph X-Y-E 602, as depicted in FIG. 6.

At 706, place the outermost nested components in a data structure. For example, a two dimensional array, such as NC[i][j] where index i is equal to zero and j ranges from zero to the number of outermost components (n).

At 708, for each nested component in the data structure, find the longest path to every other reachable node. For example, for a particular component NC[i][j], the nested component with a longest path equal to one becomes NC[i+1][j].

At 710, determine if all nodes in the data structure have been visited. If at 710, there are unvisited nodes, then element 708 is repeated. At 712, scheme 700 is complete. The example data structure NC[i][j] would include a sequence NC[0 . . . n−1][j], for a particular nested component (j), that corresponds to a single nested component.

For example, scheme 700, as applied to containment graph 500 depicted in FIG. 5, would include the graph A-C-D 502 stored in NC[0][0], and graph B-C-D 508 stored in NC[0][1] after the completion of step 706. The application of steps 708 and 710 would result in graph C-D 504 stored in NC[1][0] and NC[1][1], and component-D 518 stored in NC[2][0] and NC[2][1].

Extracted nested components from various samples can be stored in multiple instances of a data structure. To compare every node of every sample would require N[sample 1]*N[sample 2] . . . N[sample n] comparisons of data structure elements where N is the number of nodes in a sample. For nested components, it is more efficient to only compare the innermost component, e.g., a single node. If NNC[i] is defined as the number of nested components in the i-th sample, in the initial pass, a comparison of NNC[1]*NNC[2]* . . . NNC[n] can be performed. Typically, the number of nested components in a sample is far less than the total number of components. When two innermost components match across samples, then match the next outermost components may be compared in an iterative process until the largest matching component that is the shared component for that class is determined. This more expensive operation may be performed for the few cross-sample nested components where the innermost components match, thereby reducing the need for additional component comparisons.

Many techniques for measuring the similarity of malware samples are designed to address the question of executables that are largely the same with only a few differences. Of particular interest in studying the lineage of malware are disparate versions of malware that share only a few library elements. By dating some of these shared elements, it is possible to conclude that the date of any malware containing a particular component can be no older than the date when the component first emerged. By analyzing the quantity and types of components in common between two or more malware samples, information on authorship of the samples may be derived as well.

Figure 8:
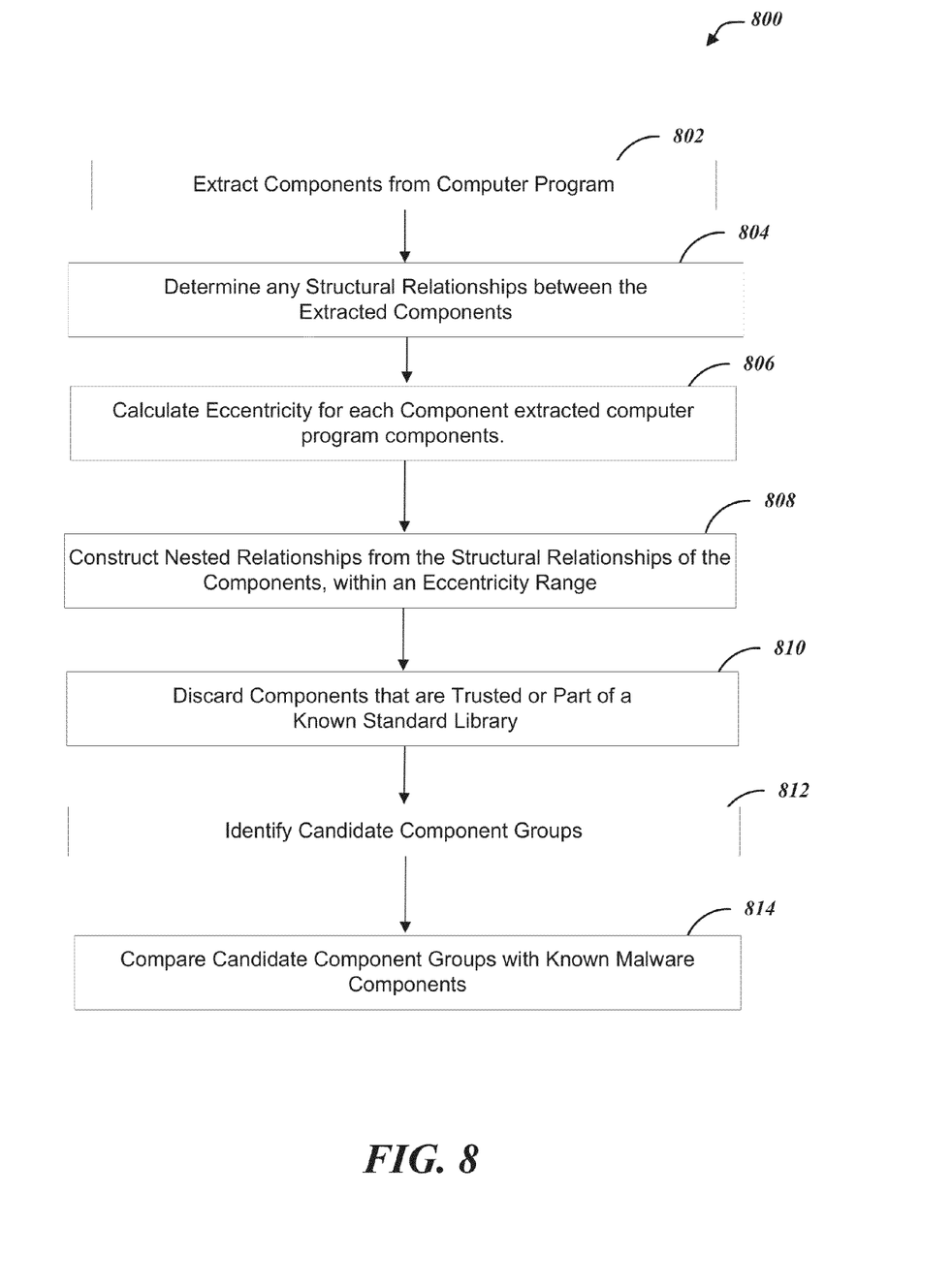
FIG. 8 illustrates a scheme for identifying potential malware components, in accordance with some embodiments.

FIG. 8 illustrates a scheme 800 for identifying potential malware components, in accordance with some embodiments.

At 802, extract components from a computer program object.

At 804, determine any structural relationship between extracted computer program components.

At 806, calculate an eccentricity for each component extracted computer program components.

At 808, construct nested relationships from the structural relationships of the components, within an eccentricity range. A nested relationship sequence may describe the structural relationship between the first component and any of a plurality of computer program components.

At 810, discard components, or groups of components, that are known to be trustworthy, or part of a known standard library. A known standard library may include libraries that are supplied with common program development tools that allow a program to interact with a particular operating system.

At 812, identify candidate components or component groups. When a component or component group in the nested relationship sequence is not present in a database of known software it may represent specific code At 814, comparing the nested relationship sequence of the candidate set of components to a set of known malware components. If matching sequences of components are found a relationship or connection may be inferred between the authors of the computer program objects based on the reuse of the component or components.

Figure 9:
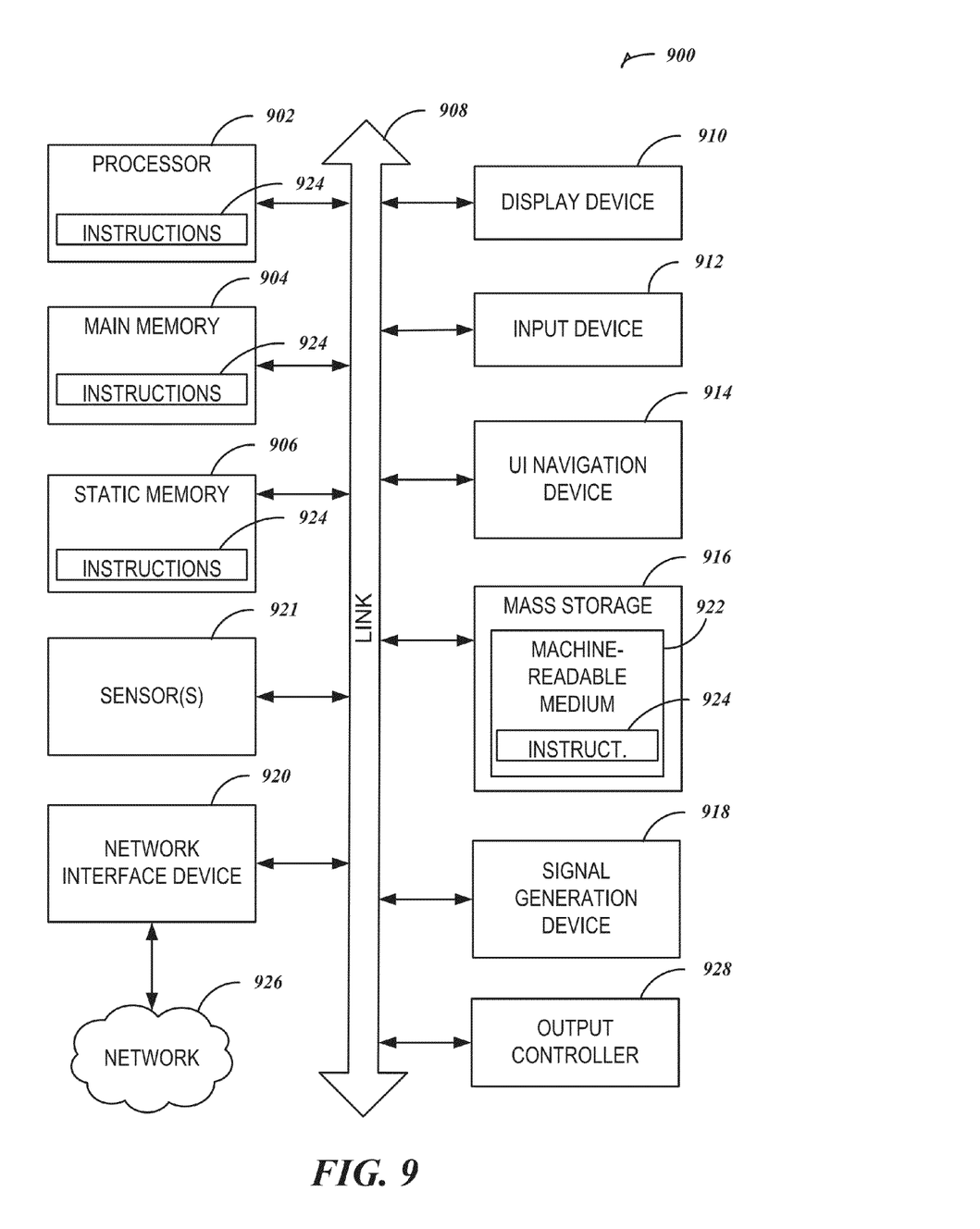
FIG. 9 illustrates a block diagram of an example machine upon which any one or more of the techniques discussed herein may be performed.

FIG. 9 illustrates a block diagram of an example machine 900 upon which any one or more of the techniques (e.g., methodologies) discussed herein may be performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a processing unit, a graphics processing unit (GPU), a hardware processor core, or any combination thereof), a main memory 904, and a static memory 906, some or all of which may communicate with each other via a link 908 (e.g., a bus, link, interconnect, or the like). The machine 900 may further include a display device 910, an input device 912 (e.g., a keyboard), and a user interface (UI) navigation device 914 (e.g., a mouse). In an example, the display device 910, input device 912, and UI navigation device 914 may be a touch screen display. The machine 900 may additionally include a mass storage (e.g., drive unit) 916, a signal generation device 918 (e.g., a speaker), a network interface device 920, and one or more sensors 921, such as a global positioning system (GPS) sensor, camera, video recorder, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The mass storage 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage 916 may constitute machine readable media.

While the machine-readable medium 922 is illustrated as a single medium, the term "machine readable medium" may include a single medium or multiple media (e.g., a centralized or distributed database, and/or associated caches and servers) that configured to store the one or more instructions 924.

The term "machine-readable medium" may include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 900, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of computer program inspection, comprising:
   extracting, with at least one processor, a plurality of computer program components from a computer program object,
   determining a hierarchical relationship between the plurality of computer program components based on structural relationships between the computer program components;
   constructing, based on an eccentricity of a root component in the plurality of computer program components extracted from the computer program object, a nested relationship sequence that describes the hierarchical relationship between the root component and a subgraph of the plurality of computer program components including a leaf node;
   identifying a candidate set of components where the nested relationship sequence is not present in a database of known program components;
   comparing the nested relationship sequence constructed from the candidate set of components to known malware components; and
   identifying authorship of the candidate set of components based at least in part on a result of the comparison.

2. The method of claim 1, wherein the eccentricity of the root component is based on a complexity of the hierarchical relationship of the computer program components.

3. The method of claim 2, wherein the eccentricity of the root component includes a determination of a longest shortest-path between components.

4. The method of claim 1, wherein the eccentricity of the root component is calculated based on a number of computer program components that are included in the nested relationship sequence of the subgraph of the plurality of computer program components.

5. The method of claim 4, comprising:
   receiving a user-specified size that limits the eccentricity of the root component identified from the candidate set of components.

6. The method of claim 1, comprising:
   constructing a call-graph characterization of the computer program object for use in extracting the plurality of computer program components.

7. The method of claim 6, wherein the computer program object is an executable computer program.

8. The method of claim 1, wherein the database of known program components includes a set of standard library components that are benign.

9. The method of claim 1, comprising:
   comparing the nested relationship sequence with a plurality of nested relationship sequences of known authorship.

10. The method of claim 9, comprising:
    determining a potential author of the computer program object based on the comparison of the nested relationships.

11. At least one non-transitory machine-readable medium comprising a plurality of instructions that in response to being executed on a computing device, cause the computing device to:
    inspect a computer program object for computer program components that are embedded in the computer program object;
    determine a hierarchical relationship between the computer program components based on structural relationships between the computer program components;
    construct, based on an eccentricity of a root component in the plurality of computer program components extracted from the computer program object, a nested relationship sequence that describes the hierarchical relationship between the root component and a subgraph of the plurality of computer program components including a leaf node;
    identify a candidate set of components where the nested relationship sequence is not present in a database of known program components; and
    compare the nested relationship sequence constructed from the candidate set of components to known malware components.

12. The non-transitory machine-readable medium of claim 11, wherein the eccentricity of the root component is based on a complexity of the hierarchical relationship of the computer program components.

13. The non-transitory machine-readable medium of claim 12, wherein the eccentricity of the root component includes a determination of a longest shortest-path between components.

14. The non-transitory machine-readable medium of claim 11, wherein the eccentricity of a root component is calculated based on a number of computer program components that are included in the nested relationship sequence of the subgraph of the plurality of computer program components.

15. The non-transitory machine-readable medium of claim 14, comprising instructions that in response to being executed on a computing device, cause the computing device to:
    receive a user-specified size that limits the eccentricity of the root component identified from the candidate set of components.

16. The non-transitory machine-readable medium of claim 11, comprising instructions that in response to being executed on a computing device, cause the computing device to:
    construct a call-graph characterization of the computer program object for use in extracting the plurality of computer program components.

17. The non-transitory machine-readable medium of claim 16, wherein the computer program object is an executable computer program.

18. The non-transitory machine-readable medium of claim 11, wherein the database of known program components includes a set of standard library components that are benign.

19. The non-transitory machine-readable medium of claim 11, comprising instructions that in response to being executed on a computing device, cause the computing device to:
compare the nested relationship sequence with a plurality of nested relationship sequences of known authorship.

20. The non-transitory machine-readable medium of claim 19, comprising instructions that in response to being executed on a computing device, cause the computing device to:
determine a potential author of the computer program object based on the comparison of the nested relationships.

21. A computer program object inspection system comprising:
one or more processors coupled to a storage element, at least one of the one or more processors being configured to inspect a computer program object stored in the storage element for computer program components that are embedded in the computer program object in order to determine a hierarchical relationship between the computer program components based on structural relationships between the computer program components; and construct, based on an eccentricity of a root component in the plurality of computer program components extracted from the computer program object, a nested relationship sequence that describes the hierarchical relationship between the root component and a subgraph of the plurality of computer program components including a leaf node;
a database module configured to store a plurality of known computer program components; and
an analysis module configured to identify a candidate set of components where the nested relationship sequence is not present in the plurality of known program components;
wherein at least one of the one or more processors is configured to compare the nested relationship sequence constructed from the candidate set of components to known malware components.

22. The system of claim 21, wherein the eccentricity of the root component is based on the complexity of the hierarchical relationship of the computer program components.

23. The system of claim 22, wherein the eccentricity of the root component includes a determination of a longest shortest-path between components.

24. The system of claim 21, wherein the measure of eccentricity of the root component is based on a number of computer program components that are included in the hierarchical nested relationship sequence of the sub graph of the plurality of computer program components.

25. The system of claim 21, wherein the computer program object is an executable computer program.

26. The system of claim 21, wherein the database of known program components includes a set of standard library components that are benign.

* * * * *

UNITED STATES PATENT AND TRADEMARK OFFICE
CERTIFICATE OF CORRECTION

| | |
|---|---|
| PATENT NO. | : 8,931,092 B2 |
| APPLICATION NO. | : 13/592596 |
| DATED | : January 6, 2015 |
| INVENTOR(S) | : Wyschogrod et al. |

It is certified that error appears in the above-identified patent and that said Letters Patent is hereby corrected as shown below:

On the Title page, in column 2, under "Other Publications", line 4, delete "Resuable" and insert -- Reusable --, therefor

IN THE SPECIFICATION

In column 5, line 62, delete "$2 \leq \varepsilon \leq 20$" and insert --$2 < \varepsilon < 20$--, therefor In column 6, line 17, delete "c," and insert --$\varepsilon$,--, therefor In column 7, line 35, delete "Subgraph" and insert --Structure--, therefor

IN THE CLAIMS

In column 11, line 33, in Claim 1, delete "object," and insert --object;--, therefor Signed and Sealed this
Fifth Day of January, 2016

Michelle K. Lee
*Director of the United States Patent and Trademark Office*